US012763326B2

(12) United States Patent
Lee et al.

(10) Patent No.: US 12,763,326 B2
(45) Date of Patent: Oct. 13, 2026

(54) POSITIVE ELECTRODE ACTIVE MATERIAL, AND POSITIVE ELECTRODE AND LITHIUM SECONDARY BATTERY INCLUDING SAME

(71) Applicant: LG Energy Solution, Ltd., Seoul (KR)

(72) Inventors: Sang Wook Lee, Daejeon (KR); Dae Jin Lee, Daejeon (KR); Sang Min Park, Daejeon (KR); Min Kwak, Daejeon (KR); Wang Mo Jung, Daejeon (KR); Gi Beom Han, Daejeon (KR); Eun Sol Lho, Daejeon (KR); Joong Yeop Do, Daejeon (KR); Kang Joon Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 669 days.

(21) Appl. No.: 18/038,923

(22) PCT Filed: Nov. 30, 2021

(86) PCT No.: PCT/KR2021/017916

§ 371 (c)(1),
(2) Date: May 25, 2023

(87) PCT Pub. No.: WO2022/114929

PCT Pub. Date: Jun. 2, 2022

(65) Prior Publication Data

US 2023/0420669 A1 Dec. 28, 2023

(30) Foreign Application Priority Data

Nov. 30, 2020 (KR) ........................ 10-2020-0164820

(51) Int. Cl.
*H01M 4/525* (2010.01)
*H01M 4/505* (2010.01)
*H01M 10/052* (2010.01)
*H01M 4/02* (2006.01)

(52) U.S. Cl.
CPC ........... *H01M 4/525* (2013.01); *H01M 4/505* (2013.01); *H01M 10/052* (2013.01); *H01M 2004/021* (2013.01); *H01M 2004/028* (2013.01)

(58) Field of Classification Search
CPC .... H01M 4/525; H01M 4/505; H01M 10/052; H01M 2004/021; H01M 2004/028
See application file for complete search history.

(56) References Cited

U.S. PATENT DOCUMENTS

2017/0288222 A1* 10/2017 Kobayashi ............. C01G 53/40
2017/0338488 A1 11/2017 Sun et al.
2019/0341598 A1* 11/2019 Nam ..................... H01M 4/134
2020/0106098 A1 4/2020 Kobayashi
2020/0161650 A1 5/2020 Park et al.
2020/0350555 A1 11/2020 Park et al.
2020/0358093 A1 11/2020 Oshita et al.
2020/0388842 A1 12/2020 Choi et al.
2020/0403239 A1 12/2020 Sun et al.
2020/0403240 A1 12/2020 Sun
2021/0265627 A1 8/2021 Hiratsuka
2022/0020983 A1 1/2022 Lho et al.
2022/0112095 A1 4/2022 Kobayashi
2023/0051717 A1 2/2023 Oshita et al.
2023/0140577 A1 5/2023 Nam et al.

FOREIGN PATENT DOCUMENTS

CN 110650922 A 1/2020
CN 111295787 A 6/2020
EP 3723173 A1 10/2020
JP 2013206553 A 10/2013
JP 2018125305 A 8/2018
JP 2020514972 A 5/2020
KR 20180084727 A 7/2018
KR 20180108521 A 10/2018
KR 20190059249 A 5/2019
KR 20190086403 A 7/2019
KR 102025190 B1 9/2019
KR 20200022313 A 3/2020
KR 20200044448 A 4/2020
KR 20200066246 A 6/2020
KR 20200067009 A 6/2020
KR 102177049 B1 11/2020
WO 2020003642 A1 1/2020

OTHER PUBLICATIONS

Extended European Search Report including Written Opinion for Application No. 21898754.3 dated Apr. 11, 2024, pp. 1-6.
Sung Min N, et.al., "Research Trends of Cathode Materials for Next Generation Lithium Ion Battery," Korean Industrial Chemistry News, Feb. 2020, vol. 23, No. 1, pp. 3-17.
International Search Report for PCT/KR2021/017916 mailed Mar. 8, 2022. 3 pages.

* cited by examiner

*Primary Examiner* — Jane J Rhee
(74) *Attorney, Agent, or Firm* — Lerner David LLP

(57) ABSTRACT

A positive electrode active material having low nickel disorder and high particle strength in a crystal structure, capable of implementing a battery having excellent capacity properties and capacity retention, and a positive electrode and a lithium secondary battery including the same. The positive electrode active material includes a large-diameter lithium transition metal oxide and a small-diameter lithium transition metal oxide whose average particle diameter ($D_{50}$) is smaller than that of the large-diameter lithium transition metal oxide. The large-diameter lithium transition metal oxide and the small-diameter lithium transition metal oxide each independently have a composition represented by Formula 1, and a crystal grain size of 100 nm to 150 nm. The difference in crystal grain size between the large-diameter lithium transition metal oxide and the small-diameter lithium transition metal oxide is less than 40 nm, and the positive electrode active material has a nickel disorder (Ni-disorder) of 1.5% or less.

11 Claims, No Drawings

POSITIVE ELECTRODE ACTIVE MATERIAL, AND POSITIVE ELECTRODE AND LITHIUM SECONDARY BATTERY INCLUDING SAME

CROSS-REFERENCE TO RELATED APPLICATIONS

The present application is a national phase entry under U.S.C. § 371 of International Application No. PCT/KR2021/017916, filed on Nov. 30, 2021, which claims priority from Korean Patent Application No. 10-2020-0164820, filed on Nov. 30, 2020, the disclosures of which are incorporated herein in their entirety by reference.

TECHNICAL FIELD

The present disclosure relates to a positive electrode active material, and a positive electrode and a lithium secondary battery including the same.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal composite oxide is used. Among such lithium transition metal composite oxides, a lithium cobalt composite metal oxide such as $LiCoO_2$, which has a high functional voltage and excellent capacity properties, has been mainly used. However, $LiCoO_2$ is very poor in thermal properties due to the destabilization of a crystal structure according to de-lithium, and also, is expensive. Therefore, $LiCoO_2$ is has a limitation in being used as a power source in a field such as an electric vehicle or the like in a large amount.

As a material to replace $LiCoO_2$, a lithium manganese composite metal oxide ($LiMnO_2$·$LiMn_2O_4$, and the like), a lithium iron phosphate compound ($LiFePO_4$ and the like), or a lithium nickel composite metal oxide ($LiNiO_2$ and the like) and the like has been developed. Among these materials, research and development has been more actively conducted on a lithium nickel composite metal oxide which has a high reversible capacity of about 200 mAh/g to easily implement a high capacity battery. However, when compared with $LiCoO_2$, $LiNiO_2$ has poor thermal stability. Furthermore, $LiNiO_2$ has a problem in that when an internal short circuit occurs due to external pressure or the like in a charged state, a positive electrode active material itself is decomposed, causing the rupture and ignition of a battery.

Accordingly, as a method for improving the thermal stability of $LiNiO_2$, which is low, while maintaining the excellent reversible capacity thereof, a nickel cobalt manganese-based lithium composite transition metal oxide in which a part of Ni is substituted with Mn and Co, a nickel cobalt aluminum-based lithium composite transition metal oxide in which a part of Ni is substituted with Mn and Al, and the like have been developed.

Meanwhile, in the case of a lithium composite transition metal oxide having a high nickel content, there is a problem in that the nickel disorder in the crystal structure of a positive electrode active material increases. Accordingly, there is a problem in that the variation of the crystal structure of the positive electrode active material crystal is increased to lower particle strength, thereby allowing particles to be easily cracked, and NiO having a rock salt structure is formed on the surface of the particles by a side reaction.

Therefore, there is a demand for the development of a positive electrode active material having low nickel disorder and high particle strength in a crystal structure while including a lithium composite transition metal oxide having a high nickel content, and capable of implementing a battery having excellent capacity properties and capacity retention.

DISCLOSURE OF THE INVENTION

Technical Problem

An aspect of the present invention provides a positive electrode active material and a method for preparing the same, the positive electrode active material having low nickel disorder and high particle strength in a crystal structure while including a lithium composite transition metal oxide having a high nickel content, and capable of implementing a battery having excellent capacity properties and capacity retention.

Technical Solution

According to an aspect of the present invention, there is provided a positive electrode active material including a large-diameter lithium transition metal oxide and a small-diameter lithium transition metal oxide whose average particle diameter ($D_{50}$ is smaller than that of the large-diameter lithium transition metal oxide, wherein the large-diameter lithium transition metal oxide and the small-diameter lithium transition metal oxide each independently have a composition represented by Formula 1 below, and has a crystal grain size of 100 nm to 150 nm, wherein the difference in crystal grain size between the large-diameter lithium transition metal oxide and the small-diameter lithium transition metal oxide is less than 40 nm.

$$Li_{x1}[Ni_{a1}Co_{b1}Mn_{c11}Al_{c12}Zr_{d1}M^1_{e1}]O_2 \quad \text{[Formula 1]}$$

In Formula 1 above, $M^1$ is one or more selected from B, Mg, Ca, V, Cr, Fe, Zn, Ga, Y, Nb, Mo, Ta, and W, and $1.0<x1\leq1.10$, $0.7\leq a1<1$, $0<b1<0.3$, $0<c11<0.3$, $0.001<c12<0.05$, $0.001\leq d1\leq0.0065$, $0\leq e1\leq0.1$, and $a1+b1+c11+c12+d1+e1=1$.

According to another aspect of the present invention, there are provided a positive electrode including the positive electrode active material and a lithium secondary battery including the positive electrode.

Advantageous Effects

The present technology provides a positive electrode active material which has a high nickel content, but has low nickel disorder and high particle strength in a crystal structure. In addition, when the positive electrode active material is applied to a battery, the battery has excellent capacity properties, and capacity retention at high temperatures.

Mode for Carrying Out the Invention

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present specification, it should be understood that the terms “include,” “comprise,” or “have” are intended to specify the presence of stated features, numbers, steps, elements, or combinations thereof, but do not preclude the presence or addition of one or more other features, numbers, steps, elements, or combinations thereof.

In the present specification, a ‘particle’ refers to a granule of a micro unit, which may be divided into a ‘ grain’ having a crystal form of several tens of nano units when enlarged and observed. When the grain is further enlarged and observed, a divided region in the form in which atoms form a lattice structure in a certain direction may be identified, which is referred to as a ‘crystal grain.’ A particle size observed in XRD is defined as a crystal grain size. The crystal grain size may be obtained through the Rietveld method using XRD data. Specifically, the crystal grain size may be obtained by placing a sample into a groove in the middle of a holder for regular powder, and using a slide glass, leveling the surface of the sample while making the height of the sample equal to the height of the edge of the holder, and then, analyzing XRD data measured (2θ=15° to 90°, Step Size=0.02°, total scan time: 20 min) using an X-ray diffraction analyzer (Bruker Corporation, D8 Endeavor) through the Fundamental Parameter Approach, which is built-in in Bruker Corporation’s TOPAS program based on the Rietveld method.

In the present specification, particle strength is measured by placing particles on a plate, and then measuring force when the particles are destroyed while increasing compressive force using a Micro Compression Testing Machine (Shimadzu Corporation, MCT-W500), and the measured force is set as a particle strength value.

Hereinafter, the present invention will be described in more detail.

Positive Electrode Active Material

The present inventors have discovered that although a positive electrode active material has a high nickel content, when the positive electrode active material includes a large-diameter lithium transition metal oxide and a small-diameter lithium transition metal oxide whose average particle diameter ($D_{50}$) is smaller than that of the large-diameter lithium transition metal oxide, wherein the large-diameter lithium transition metal oxide and the small-diameter lithium transition metal oxide each independently have a composition represented by Formula 1 below, and has a crystal grain size of 100 nm to 150 nm, wherein the difference in crystal grain size between the large-diameter lithium transition metal oxide and the small-diameter lithium transition metal oxide is less than 40 nm, the nickel disorder in a crystal structure of the positive electrode active material is low and the particle strength of the positive electrode active material is high, and when the positive electrode active material is applied to a battery, the capacity properties and capacity retention of the battery may be improved, and have completed the present technology.

The positive electrode active material according to the present technology includes a large-diameter lithium transition metal oxide and a small-diameter lithium transition metal oxide whose average particle diameter ($D_{50}$) is smaller than that of the large-diameter lithium transition metal oxide, wherein the large-diameter lithium transition metal oxide and the small-diameter lithium transition metal oxide each independently have a composition represented by Formula 1 below, and has a crystal grain size of 100 nm to 150 nm, wherein the difference in crystal grain size between the large-diameter lithium transition metal oxide and the small-diameter lithium transition metal oxide is less than 40 nm.

$$Li_{x1}[Ni_{a1}Co_{b1}Mn_{c11}Al_{c12}Zr_{d1}M^1_{e1}]O_2 \quad \text{[Formula 1]}$$

In Formula 1 above, $M^1$ is one or more selected from B, Mg, Ca, V, Cr, Fe, Zn, Ga, Y, Nb, Mo, Ta, and W, and $1.0<x1\leq1.10$, $0.7\leq a1<1$, $0<b1<0.3$, $0<c11<0.3$, $0.001<c12<0.05$, $0.001\leq d1\leq0.0065$, $0\leq e1\leq0.1$, and $a1+b1+c11+c12+d1+e1=1$.

The x1 represents the number of moles of lithium when the total number of moles of metals (Ni, Co, Zr, and M 1) other than the lithium included in a large-diameter or small-diameter lithium transition metal oxide is 1, and may satisfy $1.0<x1\leq1.10$, or $1.03\leq x1\leq1.07$. When the x1 value is within the above range, Li and Ni are in a competitive relationship in a reaction of occupying the position of Li of a crystal structure, and it is possible to lower the nickel disorder in the crystal structure by increasing the content ratio of lithium. Accordingly, a battery whose capacity properties and capacity retention are excellent may be implemented. Meanwhile, when the x1 value is 1.0 or less, there is a problem in that the nickel disorder in the crystal structure increases as the content ratio of lithium is lowered, and when the x1 value is greater than 1.10, there is a problem in that lithium by-products increase since the amount of lithium not participating in the reaction increases, and the initial efficiency is lowered since the initial discharge capacity is lowered. Meanwhile, when lithium by-products increase, there is a problem in that it is difficult to control a positive electrode active material preparation process.

The a1 represents the atomic fraction of nickel among metal elements other than lithium in a large-diameter or small-diameter lithium transition metal oxide, and may satisfy $0.7\leq a1<1$, $0.8\leq a1<1$, or $0.85\leq a1\leq0.95$. When the a1 value is 0.7 or greater, specifically 0.8 or greater, that is, in the case of a positive electrode active material having a high nickel content, there is an advantage in that capacity increases as the content of nickel which may participate in an oxidation and reduction reaction increases.

The b1 represents the atomic fraction of cobalt among metal elements other than lithium in a large-diameter or small-diameter lithium transition metal oxide, and may satisfy $0<b1<0.3$, $0<b1<0.2$, or $0<b1<0.15$.

The c11 represents the atomic fraction of a manganese element among metal elements other than lithium in a large-diameter or small-diameter lithium transition metal oxide, and may satisfy $0<c11<0.3$, $0<c11<0.2$ or $0<c11<0.15$.

The c12 represents the atomic fraction of an aluminum element among metal elements other than lithium in a large-diameter or small-diameter lithium transition metal oxide, and may satisfy $0.001<c12<0.05$, $0.005<c12<0.04$, or $0.01<c12<0.03$. When the c12 value is within the above range, there is an advantage in that thermal safety is improved and high-temperature lifespan properties are improved. Particularly, when aluminum is doped in the above content together with zirconium atoms, there is an advantage in that high-temperature lifespan properties are further improved.

The d1 represents the atomic fraction of a zirconium element among metal elements other than lithium in a large-diameter or small-diameter lithium transition metal oxide, and may satisfy $0.001 \le d1 \le 0.0065$, or $0.002 \le d1 \le 0.0045$. When the d1 value is within the above range, zirconium is substituted in a metal site, thereby increasing coupling force with oxygen, so that there is an advantage in that crystal structural stability is increased and particle strength is enhanced to increase high-temperature lifespan. Meanwhile, when the d1 value is less than 0.001, that is, in the case in which the content of zirconium in a lithium transition metal oxide is less than 940 ppm, the content is too small to exhibit an effect of enhancing structural stability and particle strength. In addition, when the d1 value is greater than 0.0065, that is, in the case in which the content of zirconium in a lithium transition metal oxide is greater than 6,000 ppm, there is a problem in that an inactive area is increased in the metal site to lower capacity.

The e1 represents the atomic fraction of an $M^1$ element among metal elements other than lithium in a large-diameter or small-diameter lithium transition metal oxide, and may satisfy $0 \le e1 \le 0.1$ or $0 \le e1 \le 0.05$.

The crystal grain size of the large-diameter or small-diameter lithium transition metal oxide may be 100 nm to 150 nm, specifically 100 nm to 140 nm, more specifically 110 nm to 130 nm. The crystal grain size of the large-diameter or small-diameter lithium transition metal oxide is within the above range, there is an advantage in that structural stability is increased since there is less contraction and expansion of the crystal structure during charging and discharging. Meanwhile, when the crystal grain size is less than 100 nm, there is a problem in that the crystal structure is not sufficiently developed, so that nickel disorder is large and particle strength is low, and when greater than 150 nm, there is a problem in that contraction and expansion of active material particles (especially primary particles) during charging and discharging are increased, so that the breakage of the particles is increased to deteriorate structural stability.

The difference in crystal grain size between the large-diameter lithium transition metal oxide and the small-diameter lithium transition metal oxide may be less than 40 nm, specifically less than 30 nm. That is, the difference in crystal grain size between the large-diameter lithium transition metal oxide and the small-diameter lithium transition metal oxide may be small. More specifically, the crystal grain size of the large-diameter lithium transition metal oxide and the crystal grain size of the small-diameter lithium transition metal oxide may be the same. In this case, since it is possible to prevent a phenomenon in which small-diameter lithium transition metal oxide or large-diameter lithium transition metal oxide particles are excessively broken during roll-pressing, when the positive electrode active material is applied to a battery, the battery may have excellent lifespan properties.

Meanwhile, when the difference in crystal grain size between the large-diameter lithium transition metal oxide and the small-diameter lithium transition metal oxide is 40 nm or greater, and when the crystal grain size of the small-diameter lithium transition metal oxide is smaller than the crystal grain size of the large-diameter lithium transition metal oxide, the small-diameter lithium transition metal oxide particles are excessively broken during roll-pressing to increase the amount of small-sized fine powder generated, and when the crystal grain size of the large-diameter lithium transition metal oxide is smaller than the crystal grain size of the small-diameter lithium transition metal oxide, there is a problem in that the large-diameter lithium transition metal oxide particles are excessively broken during roll-pressing to degrade conductivity.

Particularly, although the positive electrode active material according to the present technology is a positive electrode active material having a high nickel content, the positive electrode active material includes Zr in a specific content, the molar ratio of lithium to the total number of moles of transition metals included in the positive electrode active material is greater than 1.0 to 1.10 or less, and the crystal grain size of the positive electrode active material satisfies 100 nm to 150 nm, so that the nickel disorder in a crystal structure of the positive electrode active material is low and the particle strength of the positive electrode active material is high, and also, the size of contraction and expansion of primary particles of the active material appearing during high-temperature charging and discharging is reduced, and thus, when the positive electrode active material is applied to a battery, the capacity retention rate of the battery may be improved.

According to the present technology, the average particle diameter ($D_{50}$) of the large-diameter lithium transition metal oxide may be 8 μm to 15 μm, specifically 8 μm to 13 μm. In addition, the average particle diameter ($D_{50}$) of the small-diameter lithium transition metal oxide may be 3 μm to 7 μm, specifically 4 μm to 6 μm. The lithium transition metal oxide may be composed of a large-diameter lithium transition metal oxide having an average particle diameter ($D_{50}$) of 8 μm to 15 μm and a small-diameter lithium transition metal oxide having an average particle diameter ($D_{50}$) of 3 μm to 7 μm. The weight ratio of the large-diameter lithium transition metal oxide and the small-diameter lithium transition metal oxide may be 5:5 to 9:1, specifically 6:2 to 9:1, more specifically 7:3 to 9:1. In this case, as the roll-pressing density increases, it is easy to manufacture an electrode having a high loading (20 mg/cm 2 or greater), and particle breakage may be reduced during roll-pressing.

Meanwhile, on the surface of the lithium transition metal oxide, a coating layer including B, Zr, W, Mo, Cr, Nb, Mg, Hf, Ta, La, Sr, Ba, Ce, F, P, S, Y, or the like may be formed. Specifically, a boron coating layer including boron may be formed on the surface of the lithium transition metal oxide.

According to the inventive concept, the positive electrode active material may have a Ni-disorder of 1.5% or less, specifically 1.4% or less, preferably 0 to 1.3%. In this case, although the positive electrode active material according to the present technology has a high nickel content, it is possible to implement a battery having excellent capacity properties and capacity retention. Meanwhile, in the present specification, a nickel disorder value may mean the amount (%) of $Ni^{2+}$ ions irregularized in a lithium site obtained by obtaining XRD data using an X-ray diffraction analyzer (Bruker Corporation, D8 Endeavor), and then performing atomic structure analysis by the Rietveld method to analyze each of the relative amount of $Ni^{2+}$ ions occupying the lithium site and the relative occupancy in an oxygen site by oxygen.

According to the present technology, the particle strength of the large-diameter lithium transition metal oxide may be 140 MPa to 180 MPa, specifically 145 MPa to 180 MPa, more specifically 145 MPa to 165 MPa. In addition, the particle strength of the small-diameter lithium transition metal oxide may be 110 MPa to 150 MPa, specifically 115 MPa to 145 MPa, more specifically 120 MPa to 145 MPa. In this case, the breakage of primary particles during charging and discharging is reduced, thereby improving structural stability, so that it is possible to implement a battery with improved capacity retention at high temperatures in particular.

The positive electrode active material according to the present technology may be prepared by the following method. Specifically, the positive electrode active material according to the present technology may be prepared by preparing each of a large-diameter lithium transition metal oxide and a small-diameter lithium transition metal oxide whose average particle diameter ($D_{50}$) is smaller than that of the large-diameter lithium transition metal oxide, and mixing the two.

The large-diameter lithium transition metal oxide and the small-diameter lithium transition metal oxide may each be prepared by a method including (A) mixing a large-diameter or small-diameter transition metal precursor including nickel in an amount of 70 mol % or greater with respect to the total number of moles of transition metals, an aluminum-containing raw material, a zirconium-containing raw material, and a lithium-containing raw material to prepare a mixture, and (B) firing the mixture at a temperature of 720 °C to 780 °C to prepare a large-diameter or small-diameter lithium transition metal oxide. At this time, the lithium-containing raw material may be mixed in a content such that the molar ratio (Li/transition metal) of lithium with respect to the total number of moles of transition metals included in a large-diameter or small-diameter lithium transition metal oxide to be prepared is greater than 1.0 to 1.10 or less, the zirconium-containing raw material may be mixed in a content of 940 ppm to 6,000 ppm with respect to the transition metal precursor, and the aluminum-containing raw material may be mixed in a content of 300 ppm to 13,700 ppm with respect to the transition metal precursor.

The large-diameter or small-diameter transition metal precursor may each independently have a composition represented by Formula 2 or Formula 3 below.

$$[Ni_{a2}Co_{b2}Mn_{c21}Al_{c22}M^1_{d2}](OH)_2 \quad \text{[Formula 2]}$$

$$[Ni_{a2}Co_{b2}Mn_{c21}Al_{c22}M^1_{d2}]OOH \quad \text{[Formula 3]}$$

In Formulas 2 and 3, $M^1$ is one or more selected from B, Mg, Ca, V, Cr, Fe, Zn, Ga, Y, Nb, Mo, Ta, and W, and $0.7 \le a2 < 1$, $0 < b2 < 0.3$, $0 < c21 < 0.3$, $0.001 < c22 < 0.05$, $0 \le d2 \le 0.1$, $a2+b2+c21+c22+d2=1$.

The a2 represents the atomic fraction of nickel among metal elements in a large-diameter or small-diameter transition metal precursor, and may satisfy $0.7 \le a2 < 1$, $0.8 \le a2 < 1$, or $0.85 \le a2 \le 0.95$.

The b2 represents the atomic fraction of cobalt among metal elements in a large-diameter or small-diameter transition metal precursor, and may satisfy $0 < b2 < 0.3$, $0 < b2 < 0.2$, or $0 < b2 < 0.15$.

The c21 represents the atomic fraction of a manganese element among metal elements in a large-diameter or small-diameter transition metal precursor, and may satisfy $0 < c21 < 0.3$, $0 < c21 < 0.2$, or $0 < c21 < 0.15$.

The c22 represents the atomic fraction of an aluminum element among metal elements in a large-diameter or small-diameter transition metal precursor, and may satisfy $0.001 < c22 < 0.05$, $0.005 < c22 < 0.04$, or $0.01 < c22 < 0.03$.

The d2 represents the atomic fraction of an $M^1$ element among metal elements in a large-diameter or small-diameter transition metal precursor, and may satisfy $0 \le d2 \le 0.1$ or $0 \le d2 \le 0.05$.

The lithium-containing raw material may include one or more selected from lithium hydroxide hydrate, lithium carbonate, and lithium hydroxide. The lithium-containing raw material may be, specifically, lithium hydroxide hydrate, more specifically $LiOH \cdot H_2O$. In this case, reactivity between a precursor having a high atomic fraction of nickel among metal elements in the precursor and the lithium-containing raw material may be improved.

The lithium-containing raw material may be mixed in a content such that the molar ratio (Li/transition metal) of lithium with respect to the total number of moles of transition metals included in a lithium transition metal oxide to be prepared is greater than 1.0 to 1.10 or less, specifically in a content such that the molar ratio is 1.03 to 1.07. When the lithium-containing raw material is mixed in a content such that the molar ratio (Li/transition metal) of lithium with respect to the total number of moles of transition metals included in a lithium transition metal oxide to be prepared is 1.0 or less, there is a problem in that the nickel disorder in a crystal structure increases as the content ratio of lithium is lowered, and when mixed in a content greater than 1.10, there is a problem in that lithium by-products increase since the amount of lithium not participating in a reaction increases, and the initial efficiency is lowered since the initial discharge capacity of a positive electrode active material to be prepared is lowered.

The zirconium-containing raw material may be an acetate, nitrate, sulfate, halide, sulfide, hydroxide, oxide or oxyhydroxide containing zirconium. For example, when the zirconium-containing raw material is an oxide containing zirconium, it may be $ZrO_2$.

The zirconium-containing raw material may be mixed in a content of 940 ppm to 6,000 ppm, specifically 1,000 ppm to 6,000 ppm, more specifically 2,000 ppm to 4,000 ppm with respect to the transition metal precursor. When the zirconium-containing raw material is mixed in a content less than 940 ppm with respect to the transition metal precursor, there is a problem in that the content of zirconium is too small to exhibit an effect of enhancing structural stability and particle strength, and when mixed in a content greater than 6,000 ppm, there is a problem in that an inactive area is increased in a metal site to lower capacity.

The aluminum-containing raw material may be an acetate, nitrate, sulfate, halide, sulfide, hydroxide, oxide or oxyhydroxide containing aluminum. For example, when the aluminum-containing raw material is an oxide containing aluminum, it may be $Al_2O_3$.

The aluminum-containing raw material may be mixed in a content of 300 ppm to 13,700 ppm, specifically 1,400 ppm to 11,000 ppm, more specifically 2,800 ppm to 8,300 ppm with respect to the transition metal precursor. When the aluminum-containing raw material is mixed in a content less than 300 ppm with respect to the transition metal precursor, there is a problem in that the content of aluminum is too small to exhibit an effect of enhancing thermal stability and structural stability, and when mixed in a content greater than 13,700 ppm, there is a problem in that an inactive area is increased in a metal site to lower capacity.

Step (B) above may further include, if necessary, a process in which a fired product prepared by firing the mixture at a temperature of 720 °C to 780 °C is washed with a washing solution and then dried, and may further include a process in which the dried fired product is mixed with a coating element-containing raw material, and heat-treated to form a coating layer.

The firing may be performed at a temperature of 720 °C to 780 °C. The firing temperature may be, specifically, 730 °C to 770 °C, more specifically 740 °C to 760 °C. When the firing temperature is within the above range, crystals may be formed to a proper size, and the process cost may not be large. Particularly, a lithium transition metal oxide having a crystal grain size of 100 nm to 150 nm may be prepared.

Meanwhile, the firing temperature when preparing a large-diameter lithium transition metal oxide may be higher than the firing temperature when preparing a small-diameter lithium transition metal oxide, and accordingly, a positive electrode active material having a difference in crystal grain size of less than 40 nm, specifically less than 30 nm, more specifically 0 nm may be prepared. Specifically, the firing temperature when preparing a large-diameter lithium transition metal oxide may be higher than the firing temperature when preparing a small-diameter lithium transition metal oxide by 10 °C to 50 °C.

The firing may be performed in an oxygen atmosphere. In this case, a fired product having a structurally stable phase may be formed.

The washing is a process of removing residual lithium and the like, which are impurities, using a washing solution such as deionized water, distilled water, or the like, and the drying is a process of removing moisture from a positive electrode active material including the moisture through washing with water, and may be performed by a method known in the art.

In addition, the process of forming a coating layer is a process of forming a coating layer on the surface of a lithium transition metal oxide, which may also be performed by a method known in the art.

Positive Electrode

In addition, the present technology may provide a positive electrode for a lithium secondary battery, the positive electrode including a positive electrode active material prepared by the method described above.

Specifically, the positive electrode includes a positive electrode current collector and a positive electrode active material layer formed on at least one surface of the positive electrode current collector and including the above-described positive electrode active material.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the current collector to improve the adhesion of the positive electrode active material. For example, the positive electrode current collector may be used in various forms such as a film, a sheet, a foil, a net, a porous body, a foam, a non-woven body, and the like.

The positive electrode active material layer may include a conductive material and a binder, together with a positive electrode active material.

The positive electrode active material may be included in an amount wt % of 80 wt % to 99 wt %, more specifically 85 wt % to 98 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer, which is prepared by dissolving or dispersing the positive electrode active material described above and selectively, a binder and a conductive material in a solvent, on a positive electrode current collector, followed by drying and roll-pressing. At this time, the type and content of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Lithium Secondary Battery

In addition, the present technology may manufacture an electrochemical device including the positive electrode. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples of the negative electrode active material may include a carbonaceous material such as artificial graphite, natural graphite, graphitized carbon fiber, and amorphous carbon; a metallic substance alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic substance and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

The negative electrode active material may be included in an amount of 80 wt % to 99 wt % based on the total weight of the negative electrode active material layer.

The binder is a component for assisting in bonding between a conductive material, an active material, and a current collector, and may typically be added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 wt % or less, specifically 5 wt % or less, based on the total weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be prepared by applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

The negative electrode active material layer may be prepared by, for example, applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present technology may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, y-butyrolactone, and c-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 wt % to 5 wt % based on the total weight of the electrolyte.

The lithium secondary battery including the positive electrode active material according to the present technology as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, the present technology may provide a battery module including the lithium secondary battery as a unit cell, and a battery pack including the same.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present technology is not particularly limited, but may be a cylindrical shape using a can, a square shape, a pouch shape, a coin shape, or the like.

The lithium secondary battery according to the present technology may be used in a battery cell which is used as a power source for a small-sized device, and may also be preferably used as a unit cell for a medium- and large-sized battery module including a plurality of battery cells.

Hereinafter, embodiments of the present invention will be described in detail so that those skilled in the art may easily carry out the present invention. However, the present invention may be embodied in many different forms, and is not limited to the embodiments set forth herein.

PREPARATION EXAMPLES

Preparation Example 1

Nickel sulfate, cobalt sulfate, and manganese sulfate were mixed in deionized water in a molar ratio of 87:6:7 to prepare a metal salt aqueous solution having a concentration of 2 M. Also, a NaOH aqueous solution of 4 M and a NH4OH aqueous solution having a concentration of 7% were prepared.

To a batch-type reactor (capacity: 5 L) set at 60 °C, containers respectively containing the metal salt aqueous solution, the NaOH aqueous solution, and the NH 4 OH aqueous solution were connected. 3 L of deionized water was added to the reactor, and then a nitrogen gas was purged at a rate of 2 L/min to remove dissolved oxygen in the deionized water to create a non-oxidizing atmosphere inside the reactor. Thereafter, the NaOH aqueous solution was introduced to maintain a pH of 12.0 at a temperature of 60 °C. Thereafter, a co-precipitation reaction was performed for 10 hours by respectively introducing the metal salt aqueous solution, the NaOH aqueous solution, and the NH4OH aqueous solution at a rate of 180 ml/hr, 180 ml/hr, and 10 ml/hr to prepare a large-diameter transition metal precursor having an average particle diameter of 10 μm and a composition represented by $Ni_{0.87}Co_{0.06}Mn_{0.07}(OH)_2$.

Preparation Example 2

A small-diameter transition metal precursor having an average particle diameter of 5 μm and a composition represented by $Ni_{0.87}Co_{0.06}Mn_{0.07}(OH)_2$ was prepared in the same manner as in Preparation Example 1 except that the co-precipitation reaction was performed for 3 hours.

EXAMPLES AND COMPARATIVE EXAMPLES

Example 1

(1) Preparation of Large-Diameter Lithium Transition Metal Oxide

The large-diameter transition metal precursor prepared in Preparation Example 1, $LiOH \cdot H_2O$ as a lithium-containing raw material, and $ZrO_2$ and $Al_2O_3$ as doping element-containing raw materials were uniformly mixed to prepare a mixture. The $LiOH·H_2O$ was introduced in a content such that the molar ratio (Li/transition metal) of lithium to the total number of moles of transition metals included in a large-diameter lithium transition metal oxide to be prepared was 1:1.05, the $ZrO_2$ was introduced in a content of 3,000 ppm with respect to the large-diameter transition metal precursor, and the $Al_2O_3$ was introduced in a content of 4,700 ppm with respect to the large-diameter transition metal precursor.

In an oxygen atmosphere, the mixture was fired at 760 °C for 16 hours to prepare a fired product. The fired product was washed with deionized water, and then using a vacuum pump, moisture was removed and drying was performed. The dried fired product was mixed with 0.1 wt % of a boric acid ($H_3BO_3$), and the mixture was heat-treated at 400 °C for 5 hours to prepare a large-diameter lithium transition metal oxide (average particle diameter: 10.0 μm, composition: $Li_{1.05}(Ni_{0.87}Co_{0.06}Mn_{0.07})_{0.98}Zr_{0.0032}Al_{0.017}O_2$, crystal grain size: 120 nm) having a boron coating layer formed on the surface thereof .

(2) Preparation of Small-Diameter Lithium Transition Metal Oxide

A small-diameter lithium transition metal oxide (average particle diameter: 5.0 μm, composition: $Li_{1.05}(Ni_{0.87}Co_{0.06}Mn_{0.07})_{0.98}Zr_{0.0032}Al_{0.017}O_2$, crystal grain size: 120 nm) having a boron coating layer formed on the surface thereof was prepared in the same manner as in (1) of Example 1 except that the small-diameter transition metal precursor prepared in Preparation Example 2 was used instead of the large-diameter transition metal precursor prepared in Preparation Example 1, and the firing temperature was adjusted to 740 °C (3) Preparation of Positive Electrode Active Material The large-diameter lithium transition metal oxide and the small-diameter lithium transition metal oxide were mixed at a weight ratio of 8:2 to prepare a positive electrode active material.

Example 2

(1) Preparation of Large-Diameter Lithium Transition Metal Oxide

A large-diameter lithium transition metal oxide (average particle diameter: 10.0 μm, composition: $Li_{1.07}(Ni_{0.87}Co_{0.06}Mn_{0.07})_{0.98}Zr_{0.0032}Al_{0.017}O_2$, crystal grain size: 130 nm) having a boron coating layer formed on the surface thereof was prepared in the same manner as in (1) of Example 1 except that the $LiOH·H_2O$ was introduced in a content such that the molar ratio (Li/transition metal) of lithium to the total number of moles of transition metals included in a large-diameter lithium transition metal oxide to be prepared was 1:1.07.

(2) Preparation of Small-Diameter Lithium Transition Metal Oxide

A small-diameter lithium transition metal oxide (average particle diameter: 5.0 μm, composition: $Li_{1.07}(Ni_{0.87}Co_{0.06}Mn_{0.07})_{0.98}Zr_{0.0032}Al_{0.017}O_2$, crystal grain size: 130 nm) having a boron coating layer formed on the surface thereof was prepared in the same manner as in (2) of Example 1 except that the $LiOH·H_2O$ was introduced in a content such that the molar ratio (Li/transition metal) of lithium to the total number of moles of transition metals included in a small-diameter lithium transition metal oxide to be prepared was 1:1.07.

(3) Preparation of Positive Electrode Active Material

The large-diameter lithium transition metal oxide and the small-diameter lithium transition metal oxide were mixed at a weight ratio of 8:2 to prepare a positive electrode active material.

Example 3

(1) Preparation of Large-Diameter Lithium Transition Metal Oxide

A large-diameter lithium transition metal oxide (average particle diameter: 10.0 μm, composition: $Li_{1.03}(Ni_{0.87}Co_{0.06}Mn_{0.07})_{0.98}Zr_{0.0032}Al_{0.017}O_2$, crystal grain size: 110 nm) having a boron coating layer formed on the surface thereof was prepared in the same manner as in (1) of Example 1 except that the $LiOH·H_2O$ was introduced in a content such that the molar ratio (Li/transition metal) of lithium to the total number of moles of transition metals included in a large-diameter lithium transition metal oxide to be prepared was 1:1.03.

(2) Preparation of Small-Diameter Lithium Transition Metal Oxide

A small-diameter lithium transition metal oxide (average particle diameter: 5.0 μm, composition: $Li_{1.03}(Ni_{0.87}Co_{0.06}Mn_{0.07})_{0.98}Zr_{0.0032}Al_{0.017}O_2$, crystal grain size: 110 nm) having a boron coating layer formed on the surface thereof was prepared in the same manner as in (2) of Example 1 except that the $LiOH·H_2O$ was introduced in a content such that the molar ratio (Li/transition metal) of lithium to the total number of moles of transition metals included in a small-diameter lithium transition metal oxide to be prepared was 1:1.03.

(3) Preparation of Positive Electrode Active Material

The large-diameter lithium transition metal oxide and the small-diameter lithium transition metal oxide were mixed at a weight ratio of 8:2 to prepare a positive electrode active material.

Comparative Example 1

(1) Preparation of Large-Diameter Lithium Transition Metal Oxide

A large-diameter lithium transition metal oxide (average particle diameter: 10.0 μm, composition: $Li_{1.05}(Ni_{0.87}Co_{0.06}Mn_{0.07})_{0.9825}Zr_{0.00053}Al_{0.017}O_2$, crystal grain size: 120 nm) having a boron coating layer formed on the surface thereof was prepared in the same manner as in (1) of Example 1 except that the $ZrO_2$ was introduced in a content of 500 ppm with respect to the large-diameter transition metal precursor.

(2) Preparation of Small-Diameter Lithium Transition Metal Oxide

A small-diameter lithium transition metal oxide (average particle diameter: 5.0 μm, composition: $Li_{1.05}$ $(Ni_{0.87}Co_{0.06}Mn_{0.07})_{0.9825}Zr_{0.00053}Al_{0.017}O_2$, crystal grain size: 120 nm) having a boron coating layer formed on the surface thereof was prepared in the same manner as in (2) of Example 1 except that the $ZrO_2$ was introduced in a content of 500 ppm with respect to the small-diameter transition metal precursor.

(3) Preparation of Positive Electrode Active Material

The large-diameter lithium transition metal oxide and the small-diameter lithium transition metal oxide were mixed at a weight ratio of 8:2 to prepare a positive electrode active material.

Comparative Example 2

(1) Preparation of Large-Diameter Lithium Transition Metal Oxide

A large-diameter lithium transition metal oxide (average particle diameter: 10.0 μm, composition: $Li_{1.05}(Ni_{0.87}Co_{0.06}Mn_{0.07})_{0.975}Zr_{0.0081}Al_{0.017}O_2$, crystal grain size: 120 nm) having a boron coating layer formed on the surface thereof was prepared in the same manner as in (1) of Example 1 except that the $ZrO_2$ was introduced in a content of 7,500 ppm with respect to the large-diameter transition metal precursor.

(2) Preparation of Small-Diameter Lithium Transition Metal Oxide

A small-diameter lithium transition metal oxide (average particle diameter: 5.0 μm, composition: $Li_{1.05}(Ni_{0.87}Co_{0.06}Mn_{0.07})_{0.975}Zr_{0.0081}Al_{0.017}O_2$, crystal grain size: 120 nm) having a boron coating layer formed on the surface thereof was prepared in the same manner as in (2) of Example 1 except that the $ZrO_2$ was introduced in a content of 7,500 ppm with respect to the small-diameter transition metal precursor.

(3) Preparation of Positive Electrode Active Material

The large-diameter lithium transition metal oxide and the small-diameter lithium transition metal oxide were mixed at a weight ratio of 8:2 to prepare a positive electrode active material.

Comparative Example 3

(1) Preparation of Large-Diameter Lithium Transition Metal Oxide

A large-diameter lithium transition metal oxide (average particle diameter: 10.0 μm, composition: $Li_{1.0}(Ni_{0.87}Co_{0.06}Mn_{0.07})_{0.98}Zr_{0.0032}Al_{0.017}O_2$, crystal grain size: 120 nm) having a boron coating layer formed on the surface thereof was prepared in the same manner as in (1) of Example 1 except that the $LiOH{\cdot}H_2O$ was introduced in a content such that the molar ratio (Li/transition metal) of lithium to the total number of moles of transition metals included in a large-diameter lithium transition metal oxide to be prepared was 1:1.0, and the firing temperature was adjusted to 770 °C (2) Preparation of Small-Diameter Lithium Transition Metal Oxide A small-diameter lithium transition metal oxide (average particle diameter: 5.0 μm, composition: $Li_{1.0}(Ni_{0.87}Co_{0.06}Mn_{0.07})_{0.98}Zr_{0.0032}Al_{0.017}O_2$, crystal grain size: 120 nm) having a boron coating layer formed on the surface thereof was prepared in the same manner as in (2) of Example 1 except that the $LiOH{\cdot}H_2O$ was introduced in a content such that the molar ratio (Li/transition metal) of lithium to the total number of moles of transition metals included in a small-diameter lithium transition metal oxide to be prepared was 1:1.0, and the firing temperature was adjusted to 750 °C (3) Preparation of Positive Electrode Active Material The large-diameter lithium transition metal oxide and the small-diameter lithium transition metal oxide were mixed at a weight ratio of 8:2 to prepare a positive electrode active material.

Comparative Example 4

(1) Preparation of Large-Diameter Lithium Transition Metal Oxide

A large-diameter lithium transition metal oxide (average particle diameter: 10.0 μm, composition: $Li_{1.11}(Ni_{0.87}Co_{0.06}Mn_{0.07})_{0.98}Zr_{0.0032}Al_{0.017}O_2$, crystal grain size: 120 nm) having a boron coating layer formed on the surface thereof was prepared in the same manner as in (1) of Example 1 except that the $LiOH{\cdot}H_2O$ was introduced in a content such that the molar ratio (Li/transition metal) of lithium to the total number of moles of transition metals included in a large-diameter lithium transition metal oxide to be prepared was 1:1.11, and the firing temperature was adjusted to 740 °C (2) Preparation of Small-Diameter Lithium Transition Metal Oxide A small-diameter lithium transition metal oxide (average particle diameter: 5.0 μm, composition: $Li_{1.11}(Ni_{0.87}Co_{0.06}Mn_{0.07})_{0.98}Zr_{0.0032}Al_{0.017}O_2$, crystal grain size: 120 nm) having a boron coating layer formed on the surface thereof was prepared in the same manner as in (2) of Example 1 except that the $LiOH{\cdot}H_2O$ was introduced in a content such that the molar ratio (Li/transition metal) of lithium to the total number of moles of transition metals included in a small-diameter lithium transition metal oxide to be prepared was 1:1.11, and the firing temperature was adjusted to 720 °C (3) Preparation of Positive Electrode Active Material The large-diameter lithium transition metal oxide and the small-diameter lithium transition metal oxide were mixed at a weight ratio of 8:2 to prepare a positive electrode active material.

Comparative Example 5

(1) Preparation of Large-Diameter Lithium Transition Metal Oxide

A large-diameter lithium transition metal oxide (average particle diameter: 10.0 μm, composition: $Li_{1.05}$ $(Ni_{0.87}Co_{0.06}Mn_{0.07})_{0.98}Zr_{0.0032}Al_{0.017}O_2$, crystal grain size: 90 nm) having a boron coating layer formed on the surface thereof was prepared in the same manner as in (1) of Example 1 except that the firing temperature was adjusted to 730 °C (2) Preparation of Small-Diameter Lithium Transition Metal Oxide A small-diameter lithium transition metal oxide (average particle diameter: 5.0 μm, composition: $Li_{1.05}(Ni_{0.87}Co_{0.06}Mn_{0.07})_{0.98}Zr_{0.0032}Al_{0.017}O_2$, crystal grain size: 90 nm) having a boron coating layer formed on the surface thereof was prepared in the same manner as in (2) of Example 1 except that the firing temperature was adjusted to 710 °C (3) Preparation of Positive Electrode Active Material The large-diameter lithium transition metal oxide and the small-diameter lithium transition metal oxide were mixed at a weight ratio of 8:2 to prepare a positive electrode active material.

Comparative Example 6

(1) Preparation of Large-Diameter Lithium Transition Metal Oxide

A large-diameter lithium transition metal oxide (average particle diameter: 10.0 μm, composition: $Li_{1.05}(Ni_{0.87}Co_{0.06}Mn_{0.07})_{0.98}Zr_{0.0032}Al_{0.017}O_2$, crystal grain size: 160 nm) having a boron coating layer formed on the surface thereof was prepared in the same manner as in (1) of Example 1 except that the firing temperature was adjusted to 790 °C.

(2) Preparation of Small-Diameter Lithium Transition Metal Oxide

A small-diameter lithium transition metal oxide (average particle diameter: 5.0 μm, composition: $Li_{1.05}(Ni_{0.87}Co_{0.06}Mn_{0.07})_{0.98}Zr_{0.0032}Al_{0.017}O_2$, crystal grain size: 160 nm) having a boron coating layer formed on the surface thereof was prepared in the same manner as in (2) of Example 1 except that the firing temperature was adjusted to 760 °C (3) Preparation of Positive Electrode Active Material The large-diameter lithium transition metal oxide and the small-diameter lithium transition metal oxide were mixed at a weight ratio of 8:2 to prepare a positive electrode active material.

Comparative Example 7

The large-diameter lithium transition metal oxide (average particle diameter: 10.0 μm, composition: $Li_{1.07}(Ni_{0.87}Co_{0.06}Mn_{0.07})_{0.98}Zr_{0.0032}Al_{0.017}O_2$, crystal grain size: 130 nm) prepared in (1) of Example 2, and the small-diameter lithium transition metal oxide (average particle diameter: 5.0 μm, composition: $Li_{1.05}(Ni_{0.87}Co_{0.06}Mn_{0.07})_{0.98}Zr_{0.003}Al_{0.017}O_2$, crystal grain size: 90 nm) prepared in (2) of Comparative Example 5 were mixed at a weight ratio of 8:2 to prepare a positive electrode active material.

Comparative Example 8

The large-diameter lithium transition metal oxide (average particle diameter: 10.0 μm, composition: $Li_{1.05}(Ni_{0.87}Co_{0.06}Mn_{0.07})_{0.98}Zr_{0.003}Al_{0.017}O_2$, crystal grain size: 90 nm) prepared in (1) of Comparative Example 5, and the small-diameter lithium transition metal oxide (average particle diameter: 5.0 μm, composition: $Li_{1.07}(Ni_{0.87}Co_{0.06}Mn_{0.07})_{0.98}Zr_{0.0032}Al_{0.017}O_2$, crystal grain size: 130 nm) prepared in (2) of Example 2 were mixed at a weight ratio of 8:2 to prepare a positive electrode active material.

Comparative Example 9

(1) Preparation of Large-Diameter Lithium Transition Metal Oxide

A large-diameter lithium transition metal oxide (average particle diameter: 10.0 μm, composition: $Li_{1.05}(Ni_{0.87}Co_{0.06}Mn_{0.07})_{0.9958}Zr_{0.0032}Al_{0.001}O_2$, crystal grain size: 120 nm) having a boron coating layer formed on the surface thereof was prepared in the same manner as in (1) of Example 1 except that the $Al_2O_3$ was introduced in a content of 280 ppm with respect to the large-diameter transition metal precursor.

(2) Preparation of Small-Diameter Lithium Transition Metal Oxide

A small-diameter lithium transition metal oxide (average particle diameter: 5.0 μm, composition: $Li_{1.05}(Ni_{0.87}Co_{0.06}Mn_{0.07})_{0.9958}Zr_{0.0032}Al_{0.001}O_2$, crystal grain size: 120 nm) having a boron coating layer formed on the surface thereof was prepared in the same manner as in (2) of Example 1 except that the $Al_2O_3$ was introduced in a content of 280 ppm with respect to the small-diameter transition metal precursor.

(3) Preparation of Positive Electrode Active Material

The large-diameter lithium transition metal oxide and the small-diameter lithium transition metal oxide were mixed at a weight ratio of 8:2 to prepare a positive electrode active material.

Comparative Example 10

(1) Preparation of Large-Diameter Lithium Transition Metal Oxide

A large-diameter lithium transition metal oxide (average particle diameter: 10.0 μm, composition: $Li_{1.05}(Ni_{0.87}Co_{0.06}Mn_{0.07})_{0.9469}Zr_{0.0032}Al_{0.05}O_2$, crystal grain size: 120 nm) having a boron coating layer formed on the surface thereof was prepared in the same manner as in (1) of Example 1 except that the $Al_2O_3$ was introduced in a content of 13700 ppm with respect to the large-diameter transition metal precursor.

(2) Preparation of Small-Diameter Lithium Transition Metal Oxide

A small-diameter lithium transition metal oxide (average particle diameter: 5.0 μm, composition: $Li_{1.05}$ $(Ni_{0.87}Co_{0.06}Mn_{0.07})_{0.9468}Zr_{0.0032}Al_{0.05}O_2$, crystal grain size: 120 nm) having a boron coating layer formed on the surface thereof was prepared in the same manner as in (2) of Example 1 except that the $Al_2O_3$ was introduced in a content of 13700 ppm with respect to the small-diameter transition metal precursor.

(3) Preparation of Positive Electrode Active Material

The large-diameter lithium transition metal oxide and the small-diameter lithium transition metal oxide were mixed at a weight ratio of 8:2 to prepare a positive electrode active material.

EXPERIMENTAL EXAMPLES

Experimental Example 1: Evaluation of Ni-Disorder

For each of the positive electrode active materials prepared in Examples 1 to 3 and Comparative Examples 1 to 10, XRD data was obtained using an X-ray diffraction analyzer (Bruker Corporation, D8 Endeavor), and atomic structure analysis was performed by the Rietveld method to analyze each of the relative amount of $Ni^{2+}$ ions occupying a lithium site and the relative occupancy in an oxygen site by oxygen, and then the amount (%) of $Ni^{2+}$ ions irregularized in the lithium site obtained therefrom was set to the value of nickel disorder, which is shown in Table 1 below.

Experimental Example 2: Evaluation of Particle Strength

For particles of each of the large-diameter lithium transition metal oxide and the small-diameter lithium transition metal oxide prepared in Examples 1 to 3 and Comparative Examples 1 to 10, force was measured when the particles were destroyed while increasing compressive force using a Micro Compression Testing Machine (Shimadzu Corporation, MCT-W500), and the measured force was set as a particle strength value, which is shown in Table 1 below.

TABLE 1

| | Ni-disorder (%) | Particle strength of large-diameter lithium transition metal oxide (MPa ) | Particle strength of small-diameter lithium transition metal oxide (MPa ) |
|---|---|---|---|
| Example 1 | 1.3 | 155 | 120 |
| Example 2 | 1.3 | 160 | 140 |
| Example 3 | 1.4 | 150 | 125 |
| Comparative Example 1 | 1.2 | 105 | 80 |
| Comparative Example 2 | 1.3 | 165 | 140 |
| Comparative Example 3 | 2.1 | 140 | 110 |
| Comparative Example 4 | 1.2 | 160 | 135 |
| Comparative Example 5 | 1.6 | 130 | 100 |
| Comparative Example 6 | 1.3 | 160 | 135 |
| Comparative Example 7 | 1.4 | 160 | 100 |
| Comparative Example 8 | 1.5 | 130 | 140 |
| Comparative Example 9 | 1.4 | 150 | 115 |

TABLE 1-continued

| | Ni-disorder (%) | Particle strength of large-diameter lithium transition metal oxide (MPa ) | Particle strength of small-diameter lithium transition metal oxide (MPa ) |
|---|---|---|---|
| Comparative Example 10 | 1.3 | 160 | 120 |

Experimental Example 3: Evaluation of Half-Cell Properties

Using the positive electrode active materials prepared in Examples 1 to 3 and Comparative Examples 1 to 10, coin-type half cells were manufactured, and for each cell, the initial charge capacity, initial discharge capacity, and capacity retention were evaluated.

Specifically, each of the positive electrode active materials prepared in Examples 1 to 3 and Comparative Examples 1 and 10, a carbon black conductive material, and a PVdF binder were mixed at a weight ratio of 97.5:1.0:1.5 in an NMP solvent to prepare a positive electrode slurry. The positive electrode slurry was applied on one surface of an aluminum current collector, dried at 130 °C, and then roll-pressed to manufacture a positive electrode. Meanwhile, as a negative electrode active material, a Li metal disk was used. A separator was interposed between the positive electrode prepared above and the Li metal disk negative electrode to manufacture an electrode assembly, and the electrode assembly was placed inside a battery case, followed by injecting an electrolyte solution to the inside of the case to manufacture a coin-type half cell. At this time, as the electrolyte solution, an electrolyte solution in which $LiPF_6$ of 1 M was dissolved in an organic solvent of EC/EMC/DEC (3/3/4, vol % ) was used.

The cell manufactured as described above was charged at 25 °C with a constant current of 0.1 C to a voltage of 4.25 V, and then charged with a constant voltage (CV) until a charging current reached 0.05 mAh. Thereafter, the cell was discharged with a constant current of 0.1 C to a voltage of 3.0 V. The initial charge capacity and initial discharge capacity values are shown in Table 2.

In addition, the discharge capacity of a lithium secondary battery was measured by repeatedly performing a charging and discharging cycle 50 times with a constant current of 1 C in the range of 3.0 to 4.25 V, and in particular, the ratio of the 50-th cycle discharge capacity to the first cycle discharge capacity was set to a capacity retention rate, which is shown in Table 2 below.

TABLE 2

| | Initial charge capacity at 25° C. (mAh/g) | Initial discharge capacity at 25° C. (mAh/g) | Capacity retention rate at 45° C. (%) |
|---|---|---|---|
| Example 1 | 230 | 210 | 96 |
| Example 2 | 230.5 | 210.5 | 95 |
| Example 3 | 230 | 209.5 | 96 |
| Comparative Example 1 | 232 | 213 | 92 |
| Comparative Example 2 | 225 | 201 | 96 |
| Comparative Example 3 | 229 | 207 | 93 |
| Comparative Example 4 | 229 | 203 | 95 |

TABLE 2-continued

| | Initial charge capacity at 25° C. (mAh/g) | Initial discharge capacity at 25° C. (mAh/g) | Capacity retention rate at 45° C. (%) |
|---|---|---|---|
| Comparative Example 5 | 228 | 207 | 95 |
| Comparative Example 6 | 230 | 212 | 90 |
| Comparative Example 7 | 230 | 210 | 93 |
| Comparative Example 8 | 228.5 | 207.5 | 91 |
| Comparative Example 9 | 233 | 213 | 93 |
| Comparative Example 10 | 219 | 198 | 97 |

Referring to Table 1 and Table 2, it can be confirmed that the positive electrode active material according to the present technology has low nickel disorder and high particle strength in a crystal structure, and when the positive electrode active material is applied to a battery, the battery has excellent capacity properties, and capacity retention at high temperatures.

For the above, it can be confirmed that there are problems in that the positive electrode active material of Comparative Example 1 in which the atomic fraction of Zr is small has low particle strength due to a low doping content, and the positive electrode active material of Comparative Example 2 in which the atomic fraction of Zr is large has a low initial charge/discharge capacity due to an increase in the non-active area of a metal site. In addition, it can be confirmed that the positive electrode active material of Comparative Example 3 in which the Li/Me ratio is 1.0 has a problem in that the Ni-disorder is large, and the positive electrode active material of Comparative Example 4 in which the Li/Me ratio is 1.11 has a problem in that it is difficult to control the process due to an increase in lithium by-products, and the initial discharge capacity is low. In addition, it can be confirmed that there are problems in that the positive electrode active material of Comparative Example 5 in which the crystal grain size is 90 nm has large Ni-disorder and low particle strength due to insufficient growth of crystals, and the positive electrode active material of Comparative Example 6 in which the crystal grain size is 160 nm has an increase in the breakage of particles due to excessive contraction and expansion of primary particles during charging and discharging. In addition, it can be confirmed that the positive electrode active material of Comparative Example 7 in which the difference in crystal grain size between the large-diameter lithium transition metal oxide and the small-diameter lithium transition metal oxide is 40 nm or greater, and the crystal grain size of the small-diameter lithium transition metal oxide is smaller than the crystal grain size of the large-diameter lithium transition metal oxide has an increase in the amount of small-sized fine powder generated, and thus, has low capacity retention. In addition, it can be confirmed that the positive electrode active material of Comparative Example 8 in which the difference in crystal grain size between the large-diameter lithium transition metal oxide and the small-diameter lithium transition metal oxide is 40 nm or greater, and the crystal grain size of the large-diameter lithium transition metal oxide is smaller than the crystal grain size of the small-diameter lithium transition metal oxide has lowered conductivity since the large-sized lithium transition metal oxide particles are excessively broken, and thus, has low capacity retention. In the case of Comparative Example 9 in which the doping amount of aluminum is low, it is thought that the capacity retention is low since driving stability is degraded. In the case of Comparative Example 10 in which the doping amount of aluminum is high, it is thought that the initial charge/discharge capacity is reduced due to an increase in the non-active area of a metal site.

Experimental Example 4: Evaluation of Differential Scanning Calorimetry (DSC)

The evaluation of differential scanning calorimetry (DSC) was performed on the coin-type half cells manufactured using the positive electrode active materials of Example 1 and Comparative Example 9 and Comparative Example 10 among the coin-type half cells manufactured in Experimental Example 3.

Specifically, using the HP-DSC device of Setaram Corporation, the coin half cells (CHC) were charged to 4.25 V (SOC 100). Specifically, the coin-type half cells were charged to 4.25 V at 25 °C with a constant current of 0.1 C, and charged with a constant voltage until a charging current reached 0.05 mAh. Thereafter, the cells were discharged with a constant current of 0.1 C to a voltage of 3.0 V. Again, the cells were charged with a constant current of 0.1 C to a voltage of 4.25 V, and charged with a constant voltage until a charging current reached 0.05 mAh. Thereafter, an electrode was disassembled and the electrode was cleaned with dimethyl carbonate (DMC), and then the electrode was punched to a diameter of 5 mm, and placed in a high-pressure PAN with 20 ul of an electrolyte solution which was injected thereto, and the temperature was raised from room temperature to 400 °C at a rate of 10 °C/min to measure the exothermic starting temperature.

TABLE 3

| | DSC $1^{st}$ temperature (° C.) |
|---|---|
| Example 1 | 228 |
| Comparative Example 9 | 218 |
| Comparative Example 10 | 233 |

As it can be seen from the results of Table 2 and Table 3 above, it can be confirmed that in the case of Comparative Example 9 in which the atomic fraction of Al is small, there is a problem in that the capacity is increased, but the capacity retention and DSC thermal stability are degraded, and in the case of Comparative Example 10 in which the atomic fraction of Al is large, there is a problem in that the capacity retention and DSC thermal stability are improved, but the capacity is significantly reduced.

The invention claimed is:

1. A positive electrode active material comprising:

a large-diameter lithium transition metal oxide; and a small-diameter lithium transition metal oxide whose average particle diameter ($D_{50}$) is smaller than that of the large-diameter lithium transition metal oxide, wherein the large-diameter lithium transition metal oxide and the small-diameter lithium transition metal oxide each independently have a composition represented by Formula 1 below, and have a crystal grain size of 100 nm to 150 nm, wherein a difference in crystal grain size between the large-diameter lithium transition metal oxide and the small-diameter lithium transition metal oxide is less than 40 nm, and the positive electrode active material has a nickel disorder (Ni-disorder) of 1.5% or less:

$$L_{x1}[Ni_{a1}Co_{b1}Mn_{c11}Al_{c12}Zr_{d1}M^2_{e1}]O_2 \quad \text{[Formula 1]}$$

wherein in Formula 1 above, $M^2$ is one or more selected from B, Mg, Ca, V, Cr, Fe, Zn, Ga, Y, Nb, Mo, Ta, and W, and $1.03 \leq x1 \leq 1.07$, $0.7 \leq a1 < 1$, $0 < b1 < 0.3$, $0 < c11 < 0.3$, $0.001 < c12 < 0.05$, $0.001 \leq d1 \leq 0.0065$, $0 \leq e1 \leq 0.1$, and $a1+b1+c11+c12+d1+e1=1$.

2. The positive electrode active material of claim 1, wherein the a1 satisfies $0.8 \leq a1 < 1$.

3. The positive electrode active material of claim 1, wherein the d1 satisfies $0.002 \leq d1 \leq 0.0045$.

4. The positive electrode active material of claim 1, wherein the large-diameter lithium transition metal oxide and the small-diameter lithium transition metal oxide each independently have the crystal grain size of 100 nm to 140 nm.

5. The positive electrode active material of claim 1, wherein the large-diameter lithium transition metal oxide has a particle strength of 140 MPa to 180 MPa.

6. The positive electrode active material of claim 1, wherein the small-diameter lithium transition metal oxide has a particle strength of 110 MPa to 150 MPa.

7. The positive electrode active material of claim 1, wherein the large-diameter lithium transition metal oxide has the average particle diameter ($D_{50}$) of 8 μm to 15 μm.

8. The positive electrode active material of claim 1, wherein the small-diameter lithium transition metal oxide has the average particle diameter ($D_{50}$) of 3 μm to 7 μm.

9. The positive electrode active material of claim 1, wherein a weight ratio of the large-diameter lithium transition metal oxide and the small-diameter lithium transition metal oxide is 5:5 to 9:1.

10. A positive electrode comprising a positive electrode active material according to claim 1.

11. A lithium secondary battery comprising the positive electrode according to claim 10.

* * * * *